G. M. HUBBARD.
SNAP-HOOK.

No. 172,319. Patented Jan. 18, 1876.

Witnesses
J. V. Shumway
Clara Broughton

Geo. M. Hubbard
By Atty. Inventor
Jno. E. Earle

N. PETERS, PHOTO-LITHOGRAPHER, WASHINGTON, D.C.

UNITED STATES PATENT OFFICE.

GEORGE M. HUBBARD, OF NEW HAVEN, CONNECTICUT, ASSIGNOR TO O. B. NORTH & CO., OF SAME PLACE.

IMPROVEMENT IN SNAP-HOOKS.

Specification forming part of Letters Patent No. 172,319, dated January 18, 1876; application filed November 2, 1875.

CASE A.

*To all whom it may concern:*

Be it known that I, GEORGE M. HUBBARD, of New Haven, in the county of New Haven and State of Connecticut, have invented a new Improvement in Snap-Hooks; and I do hereby declare the following, when taken in connection with the accompanying drawings, and the letters of reference marked thereon, to be a full, clear, and exact description of the same, and which said drawings constitute part of this specification, and represent in—

Figure 1:
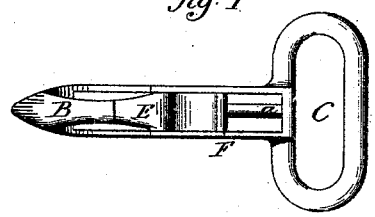
Figure 2:
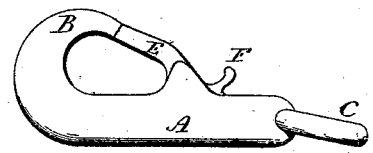
Figure 5:
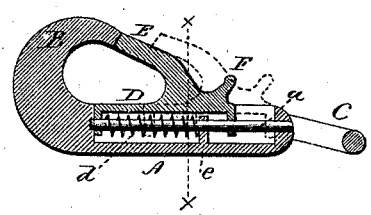
Figures 3, 4:

Figure 1, top view; Fig. 2, side view; Fig. 3, longitudinal section; Fig. 4, transverse section on line $xx$; Fig. 5, modification of the same.

This invention relates to an improvement in that class of snap-hooks in which the tongue is moved to and from the hook in, substantially, a longitudinal line; and it consists, principally, in constructing the body of the hook with a longitudinal recess extending forward below the point of the hook, with a stationary bar in said recess, and the tongue constructed with a shank to run upon said bar, and recessed around said bar to receive a spring, all as more fully hereinafter described.

A is the body, terminating at one end in the hook B, and at the other in a loop, C, or other device by which to attach the hook. On the upper side the body is recessed longitudinally, the said recess extending forward beneath the hook end, and longitudinally in this recess a stationary bar, $a$, is arranged. The tongue E is constructed with a shank, D, arranged upon the said bar so as to move freely longitudinally thereon, and with suitable bearing in said recess to support the tongue transversely. The shank D extends forward, so that when the tongue is closed against the hook the shank will, substantially, close the forward end of the recess in the body. The shank of the tongue is as much shorter than the recess in the body as the movement required for the tongue. The shank D is recessed around the bar, the recess extending so far forward as only to leave the closed end of the shank around the bar, and into this recess in the shank and around the bar a spring, $d$, is arranged, its forward end bearing against the forward end of the recess in the shank and the rear end against a stud or shoulder, $e$, on the body; hence, when the tongue is drawn back, as indicated in broken lines, Fig. 3, the spring will be compressed against the stud $e$, and so that when the tongue is released the reaction of the spring will return and close the tongue.

Extending the recess in the body and the shank in the tongue forward, as described, enables the shortening of the hook over what could be done by making the recess farther to the rear, because of its allowing the spring to be set so much nearer the forward end of the hook.

The recess may be made so as to leave the sides of the body up each side of the shank, as seen in Fig. 4, to form the transverse support, or it may be made as seen in Fig. 5, the sides cut away and the shank filling the entire space.

I am aware that it is not new to construct a snap-hook with a longitudinally-sliding tongue, arranged upon a guide-bar, and, therefore, I do not wish to be understood as claiming any of the parts, except as in the combination hereinafter specified.

I claim—

1. The combination, in a snap-hook, of the body A, one end terminating in the hook proper, the other in a means for attaching the hook, a stationary longitudinal bar, the tongue constructed with the shank D, arranged upon said longitudinal bar, and recessed so as to form a chamber around said bar, and with a spring arranged in said chamber to close the said tongue, substantially as described.

2. In a snap-hook, in which the tongue is arranged to move longitudinally to and from the hook end, a recess in the body of the said hook extending forward to beneath the end of the hook, and the tongue constructed with a shank extending forward into said recess, and the said shank recessed forward to receive a spring operating to close the said tongue, substantially as described.

GEO. M. HUBBARD.

Witnesses:
J. H. SHUMWAY,
CLARA BROUGHTON.